United States Patent
Li et al.

(10) Patent No.: US 10,176,015 B2
(45) Date of Patent: Jan. 8, 2019

(54) PROGRESS VISUALIZATION OF COMPUTATIONAL JOB

(71) Applicant: Microsoft Technology Licensing, LLC, Redmond, WA (US)

(72) Inventors: Pu Li, Sammamish, WA (US); Omid Afnan, Beijing (CN); Dian Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 15/153,555

(22) Filed: May 12, 2016

(65) Prior Publication Data

US 2017/0090984 A1    Mar. 30, 2017

Related U.S. Application Data

(60) Provisional application No. 62/233,196, filed on Sep. 25, 2015.

(51) Int. Cl.
*G06F 9/50*    (2006.01)

(52) U.S. Cl.
CPC ...................... *G06F 9/50* (2013.01)

(58) Field of Classification Search
CPC combination set(s) only.
See application file for complete search history.

(56) References Cited

U.S. PATENT DOCUMENTS

| 8,707,275 B2 | 4/2014 | Mascaro et al. |
| 9,110,706 B2 | 8/2015 | Yu et al. |
| 2006/0075408 A1 | 4/2006 | Powers et al. |
| 2006/0195508 A1 | 8/2006 | Bernardin et al. |
| 2010/0241828 A1 | 9/2010 | Yu et al. |
| 2010/0241884 A1* | 9/2010 | Barsness ............... G06F 1/3203 713/322 |
| 2012/0066667 A1* | 3/2012 | Mascaro ............... G06F 9/5066 717/127 |
| 2013/0117305 A1 | 5/2013 | Varakin et al. |
| 2013/0166724 A1* | 6/2013 | Bairavasundaram ........ G06F 9/5016 709/224 |

(Continued)

OTHER PUBLICATIONS

Garduno, et al., "Theia: Visual Signatures for Problem Diagnosis in Large Hadoop Clusters", In Proceedings of 26th Large Installation System Administration Conference, Dec. 9, 2012, pp. 33-42.

(Continued)

*Primary Examiner* — Sisley N Kim
(74) *Attorney, Agent, or Firm* — Workman Nydegger

(57) ABSTRACT

The visualization of progress of a distributed computational job at multiple points of execution. After a computational job is compiled into multiple vertices, and then those multiple vertices are scheduled on multiple processing nodes in a distributed environment, a processing gathering module gathers processing information regarding processing of multiple vertices of a computational job, and at multiple instances in time in the execution of the computational job. A user interface module graphically presents a representation of an execution structure representing multiple nodes of the computational job, and dependencies between the multiple nodes, where the nodes may be a single vertex or a group of vertices (such as a stage).

19 Claims, 8 Drawing Sheets

(56) References Cited

U.S. PATENT DOCUMENTS

2013/0254196 A1 9/2013 Babu et al.
2013/0268941 A1 10/2013 Cherkasova et al.
2013/0346988 A1 12/2013 Bruno et al.

OTHER PUBLICATIONS

Chen, et al., "Large Graph Processing in the Cloud", In Proceedings of the ACM SIGMOD International Conference Management of Data, Jun. 6, 2010, 4 pages.

Yu, et al., "DryadLINQ: A System for General-Purpose Distributed Data-Parallel Computing Using a High-Level Language", In Proceedings of Eighth Symposium on Operating System Design and Implementation, Dec. 2008, pp. 1-13.

Pauw, et al., "Visualizing large-scale streaming applications", In Journal of Information Visualization archive, vol. 8, Issue 2, Apr. 2009, 1 page.

Tadel, Matevž, "A ROOT based Framework for Distributed Computing and Dynamic Visualization", In Proceedings of International conference on Computing in high Energy and Nuclear Physics, Feb. 13, 2006, 21 pages.

\* cited by examiner

PROGRESS VISUALIZATION OF COMPUTATIONAL JOB

CROSS-REFERENCE TO RELATED APPLICATION

This application claims the benefit of U.S. Provisional Patent Application Ser. No. 62/233,196 filed Sep. 25, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. Computing systems are particularly adept at processing data. When processing large amounts of data (often referred to simply as "big data") that itself might be distributed across multiple network nodes, it is often most efficient to divide data processing amongst various network nodes. For instance, those various network nodes may be processing nodes within a cloud computing environment.

To divide data processing amongst the various processing nodes, the code is compiled into segments called vertices, with each vertex to be assigned for processing on a corresponding processing node. Not only does this allow for efficiencies of parallelizing, but it also allows for the data that is being processed to be closer to the processing node that is to process that portion of the data.

One common programming model for performing such parallelization is often referred to as the map-reduce programming model. In the mapping phase, data is divided by key (e.g., along a particular dimension of the data). In the reduce phase, the overall task is then divided into smaller portions that can be performed by each network node, such that the intermediate results obtained thereby can then be combined into the final result of the overall job. Many big data analytical solutions build upon the concept of map reduce.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the visualization of progress of a distributed computational job at multiple points of execution. After a computational job is compiled into multiple vertices, and then those multiple vertices are scheduled on multiple processing nodes in a distributed environment, a processing gathering module gathers processing information regarding processing of multiple vertices of a computational job, and at multiple instances in time of the execution of the computational job. A user interface module graphically presents a representation of an execution structure representing multiple nodes of the computational job, and dependencies between the multiple nodes, where the nodes may be a single vertex or a group of vertices (such as a stage).

With these multiple points in time of execution progress being gathered, powerful visualization tools are enabled in the context of an intuitive representation (e.g., a job tree) of a computational job. For instance, a developer could replay the execution of the computational job in a shorter time, pause the user interface (either from live or within a replay), fast forward, rewind, and so forth, watching the intuitive representation of the computational job change. Coloring or other visual emphasis may be used based on evaluation of job progress with respect to a norm. Thus, a developer might see where a node or vertex is executing, reading, writing or performing any operation slower than expected. Thus, a valuable tool for improving the development and performance of distributed computational jobs has been provided.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the visualization of progress of a distributed computational job at multiple points of execution. After a computational job is compiled into multiple vertices, and then those multiple vertices are scheduled on multiple processing nodes in a distributed environment, a processing gathering module gathers processing information regarding processing of multiple vertices of a computational job, and at multiple instances in time in the execution of the computational job. A user interface module graphically presents a representation of an execution structure representing multiple nodes of the computational job, and dependencies between the multiple nodes, where the nodes may be a single vertex or a group of vertices (such as a stage).

With these multiple points in time of execution progress being gathered, powerful visualization tools are enabled in the context of an intuitive representation (e.g., a job tree) of a computational job. For instance, a developer could replay the execution of the computational job in a shorter time, pause the user interface (either from live or within a replay), fast forward, rewind, and so forth, watching the intuitive representation of the computational job change. Coloring or other visual emphasis may be used based on evaluation of job progress with respect to a norm. Thus, a developer might see where a node or vertex is executing, reading, writing or performing any operation slower than expected. Thus, a valuable tool for improving the development and performance of distributed computational jobs has been provided.

Some introductory discussion of a computing system will be described with respect to FIG. 1. Then, the mechanism and methods that enable powerful visualization of distributed computational job progress will be described with respect to FIGS. 2 through 9.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
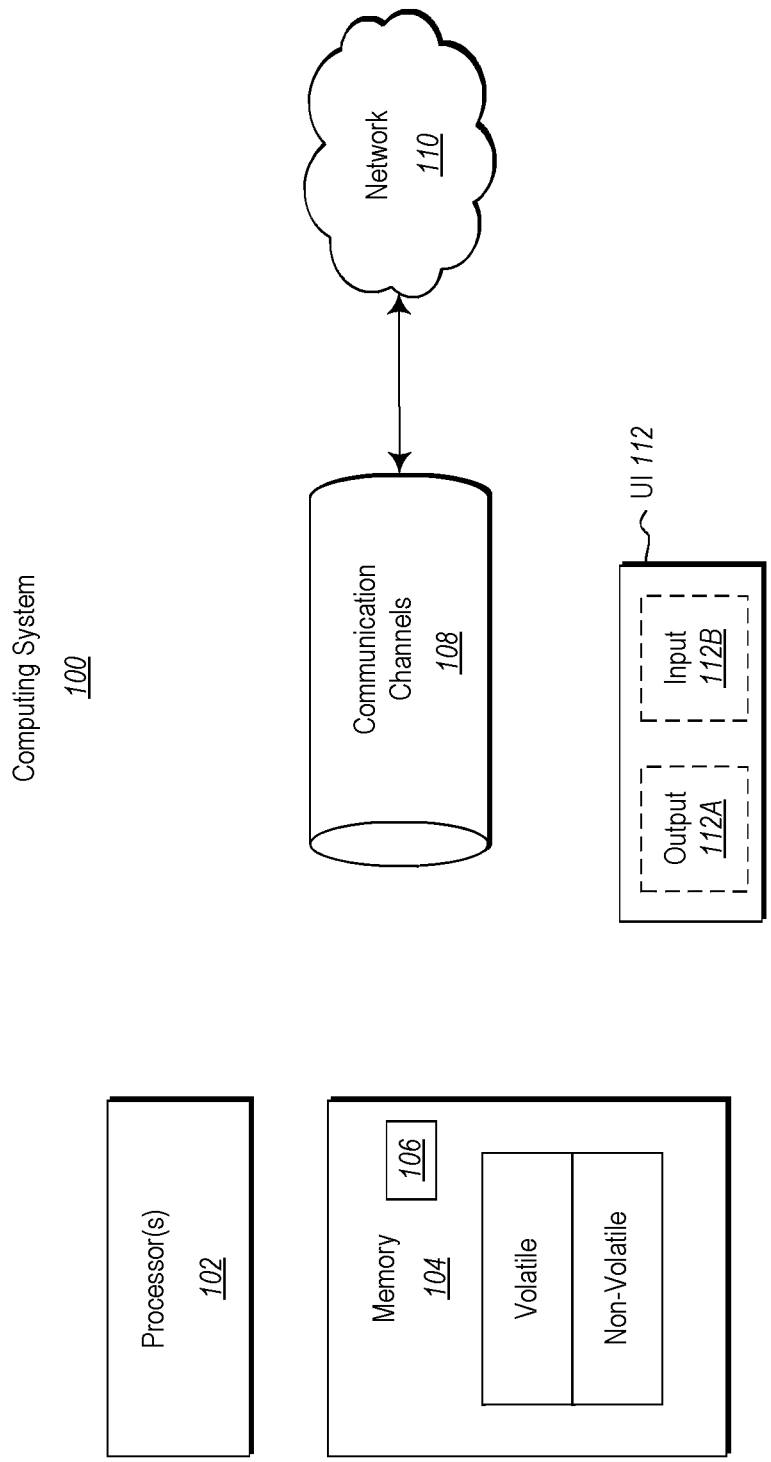
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms and so forth. Examples of input mechanisms 112B might include, for instance, microphones, touchscreens, holograms, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
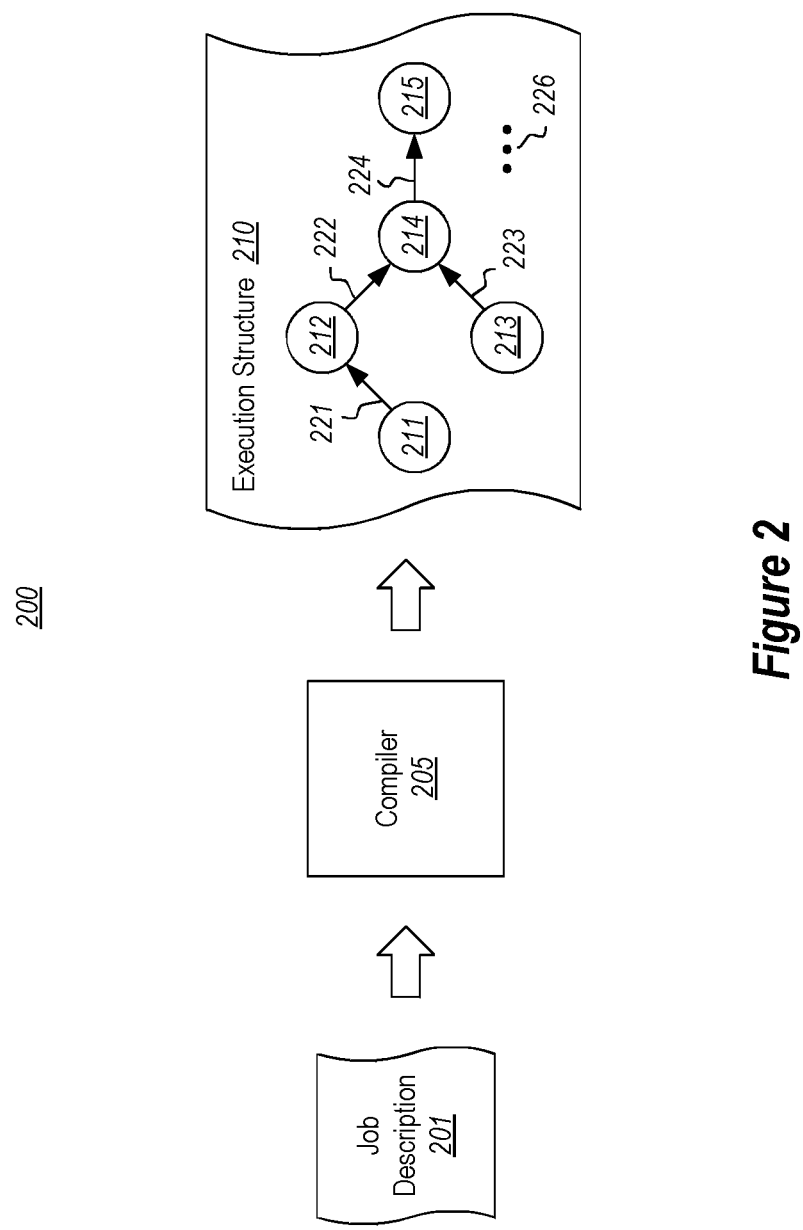
FIG. 2 illustrates an architecture in which a job description is compiled by a compiler into an execution structure.

FIG. 2 illustrates an architecture 200 in which a job description 201 is compiled by a compiler 205 into an execution structure 210. The compiler 205 may, for instance, be a computing system such as the computing system 100 described above with respect to FIG. 1. The compiler 205 may alternatively or more specifically be an executable component (such as the executable component 106) that runs on a computing system (such as the computing system 100). In one example, the job description 201 may be a query. However, the job description 201 may be any definition of a computational job to be accomplished.

In FIG. 2, the execution structure 210 is illustrated as including five vertices 211 through 215 (as represented as circles) that have certain dependences 221 through 224 (as represented by arrows 221 through 224). However, the ellipses 226 represent that the principles described herein are not limited to the exact structure of the execution structure 210. The execution structure 210 will depend on the job to be accomplished (i.e., the job description 201), how the compiler 210 decides the job is to be divided into smaller logical tasks (referred to as a vertex), and the dependencies that exist between those vertices. In the most trivial case, the execution structure may simply be a single vertex. In more complex cases, the execution structure may comprise thousands or even perhaps millions of vertices. In any case, the principles described herein are applicable regardless of the execution structure, how many vertices exist in the execution structure, and how the vertices are interrelated.

Figure 3:
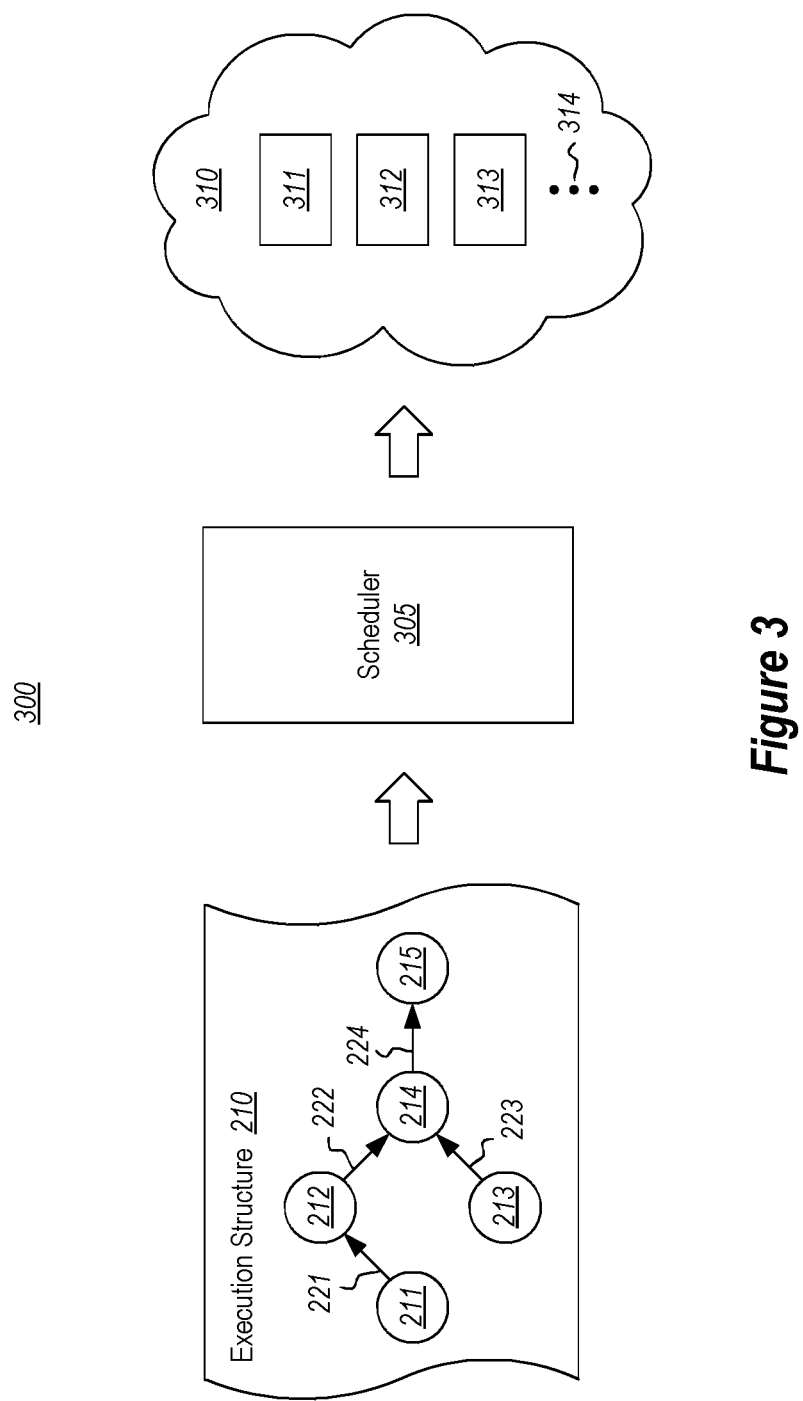
FIG. 3 illustrates an environment in which a scheduler uses the execution structure to determine when the tasks associated with a vertex is to be performed, and on what processing node within a distributed environment.

FIG. 3 illustrates an environment 300 in which a scheduler module 305 uses the execution structure 210 to determine when the tasks associated with a vertex is to be performed, and on what processing node within a distributed environment 310. Again the scheduler 305 may be a computing system such as the computing system 100 of FIG. 1, or may be software (such as executable component 106) that executes on such a computing system. The distributed environment 310 is illustrated as including three processing nodes 311 through 313, though the ellipses 314 symbolizes that the distributed environment may include any number of processing nodes capable of performing tasks of the job represented by the execution structure 210. In one embodiment, the distributed environment 310 is a cloud computing environment. The scheduler module 310 has a concept for the set of resources that are allocated for performance of the computational job.

Figure 4:
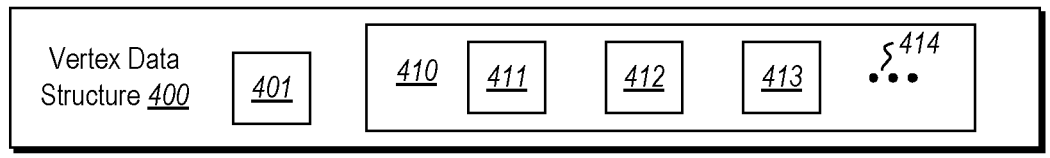
FIG. 4 illustrates a vertex data structure that includes a variety of fields including a vertex identifier and operational data.

FIG. 4 illustrates a vertex data structure 400 that includes a variety of fields including a vertex identifier 401 and operational data 410. The vertex data structure 400 includes a variety of fields including a vertex identifier 401 and operational data 410. The operational data 410 includes information regarding execution of the vertex on the associated processing node scheduled by the scheduler. For instance, the operational data 410 may include a processing node identifier 411, a job result indication 412, a duration field 413 and so forth. Such vertex data structures may be gathered for each of multiple vertices or vertex groups, and may be gathered at multiple instances of time in the processing of the each of the multiple vertices or vertex groups.

Figure 5:
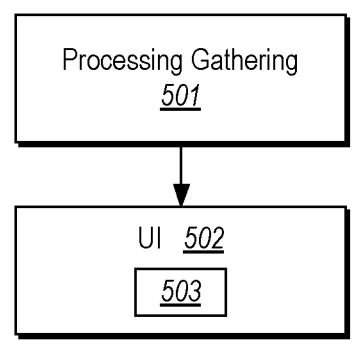
FIG. 5 illustrates a job execution visualization infrastructure in accordance with the principles described herein, which includes a processing gathering module as well as a user interface module.

FIG. 5 illustrates a job execution visualization infrastructure 500 in accordance with the principles described herein. The job execution visualization infrastructure 500 includes a processing gathering module 501 configured to gather processing information regarding the processes of the various vertices of the distributed computational job. As an example, the job execution visualization infrastructure 500 may gather and store a vertex data structure 400 for each vertex for each of multiple instances in time in the execution of the computational job.

The processing gathering module 501 may also generate data structures that describe performance at various instances in time of groups of vertices. An example of a group of vertices that may have a corresponding data structure is a group of vertices that belong to a same stage of the overall computational job. The gathering module 501 may also determine additional dynamic data based on comparison of multiple vertex data structures that correspond to different points in time. For instance, the gathering module 501 may gather rates of data throughput, such as rates of reads, rates of writes, rate of processing cycles expensed per unit time, and so forth. The gathering module 501 may be structured as described above for the executable component 106.

The job execution visualization infrastructure 500 also includes a user interface module 502 that graphically represent the execution structure in the form of multiple nodes, each node representing one or more vertices of the computational job. The user interface module 502 visualizes the gathered processing information as it existed at each of multiple times of execution of the computational job for multiple nodes of that execution structure.

The user interface module 502 has controls 503 that allow for navigation to a particular point in time of the execution of the computational job. The control 503 may perhaps allow for replaying the execution of the job. The visualized vertex or vertex set (i.e., the node) may have color coding, patterns, or other visualizations that emphasize when the execution of the vertex of vertex set drifts away from performance norms. This allows the developer to see where and when problems developed due to localized performance deviation. The user interface module 502 and the control 503 may each be structured as described above for the executable component 106.

Figure 6:
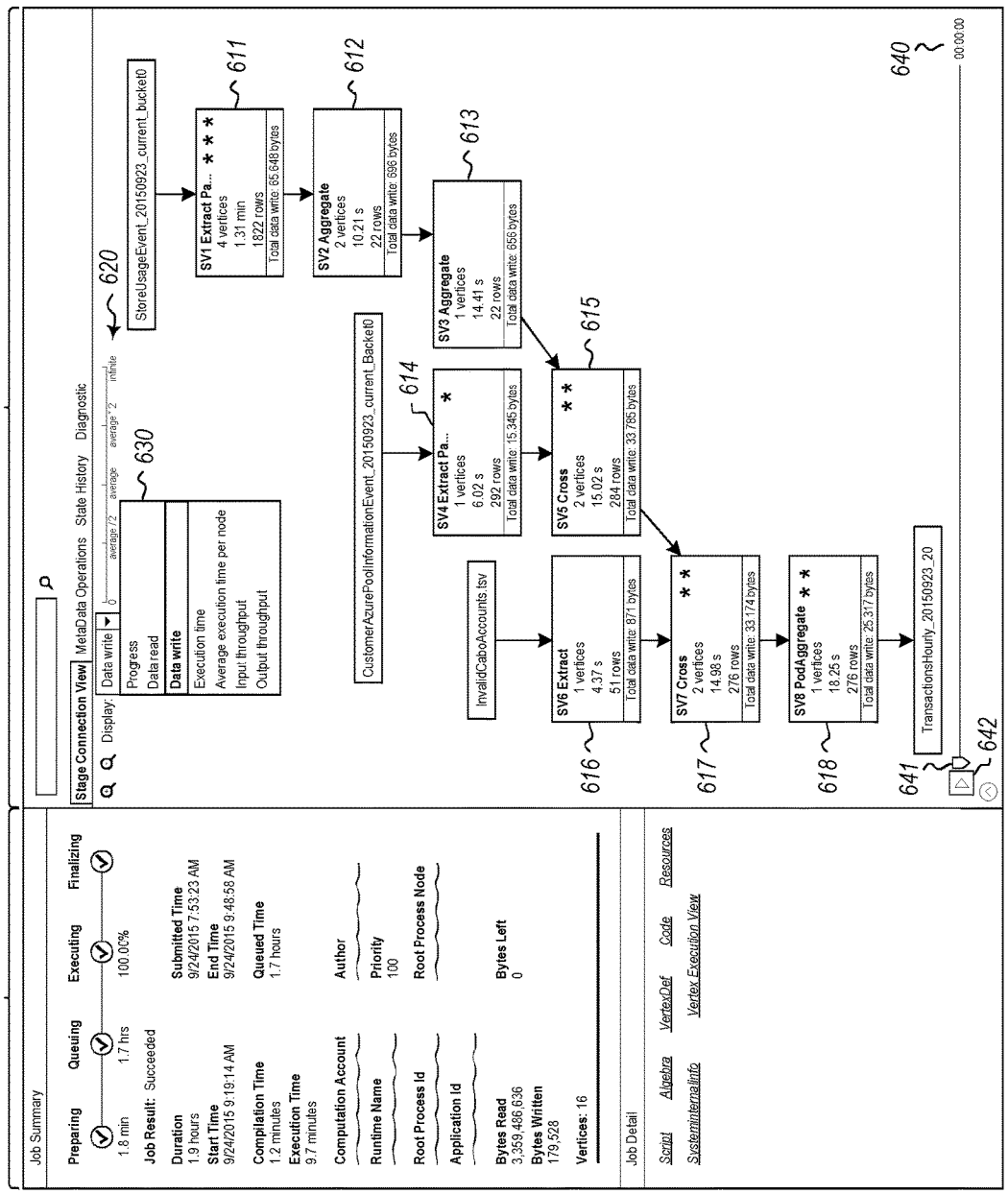
FIG. 6 illustrates an example user interface, in which the left pane illustrates overall job execution summary statistics, and the right pane, collections of vertices are each represented by a box.

FIG. 6 illustrates an example user interface 600. In FIG. 6, the left pane 601 illustrates overall job execution summary statistics, such as job result, duration, submitted time, start time, end time, compilation time, queued time, execution time, the account charged for the execution, the author of the job, the runtime name, the priority, the root process id, the root process node, the application id, the number of bytes, read, the number of bytes written, the number of bytes left, the number of vertices, and so forth.

In the right pane 602, collections of vertices are each represented by a box, often called herein "nodes" (see nodes 611 through 618). The visualization of the vertices collection includes text showing the number of vertices represented, the duration, amount of data processed (rows in this example), and the data throughoutput.

Although not shown in FIG. 6, color coding of the boxes might allow the user to see if a particular set of vertices (e.g., a particular stage of computation) varied significant from an expected norm. A color scale may show what a color means as far as variance from an expected norm. For instance, scale 620 might show a color code for an expected norm. The nodes 611 through 618 might be colored in accordance this norm.

The parameter for measuring variations from the expected norm may be changed via the drop down menu 630 (e.g., to data reads, execution time, average execution time per node, input throughput, output throughput, data writes, and so forth). Here, the selected parameter is "data writes". Accordingly, each node 611 through 618 includes the number of data writes at its bottom portion. Furthermore, the coloring of the nodes may change to reflect deviation of the corresponding one or more vertices from the expected norm.

For instance, while FIG. 6 is not colored, it does symbolically represent the use of color via the number of asterisks appearing in the upper right portion of the node. For instance, node 611 has three asterisks and thus may have a color more towards the right of the color scale 620 representing that the number of data writes for that node was much higher than average. Nodes 615, 617 and 618 have two asterisks and thus may have a color more towards the middle or middle right of the color scale 620, representing that the number of data writes for these nodes was at or somewhat higher than average. Node 614 has ones asterisk and thus may have a color more towards the middle or middle left of the color scale 620, representing that the number of data writes for node was somewhat below the average. Nodes 612, 613 and 616 have no asterisks and thus may have a color more towards the left of the color scale 620, representing that the number of data writes for these nodes well below average. Thus, the user may, for any of the parameters in the drop down menu 630, get an immediate view of what nodes could be causing problems or slow downs in execution of a computational job.

The user interface 602 also includes a playback control. The playback control 640 is illustrated with the tracker 641 in the leftmost position near that start control 642. The user may initiate playback or the execution via the start control 642, or otherwise move the tracker 641 to any portion of the range to jump to a particular point in execution of the computational job. Coloring of the nodes 611 through 618 may likewise change dynamically during the playback to reflect changes in performance with respect to the norm in regards to the selected parameter from drop down menu 630. Furthermore, movement of the tracker 641 to a particular point in execution will likewise cause coloring changes. Thus, the user may be able to get an intuitive view of performance and deviation with respect to a norm at many or any point in execution of the computational job, and with respect to any of the available parameters for which data was gathered during the original execution of the computational job.

Figure 7:
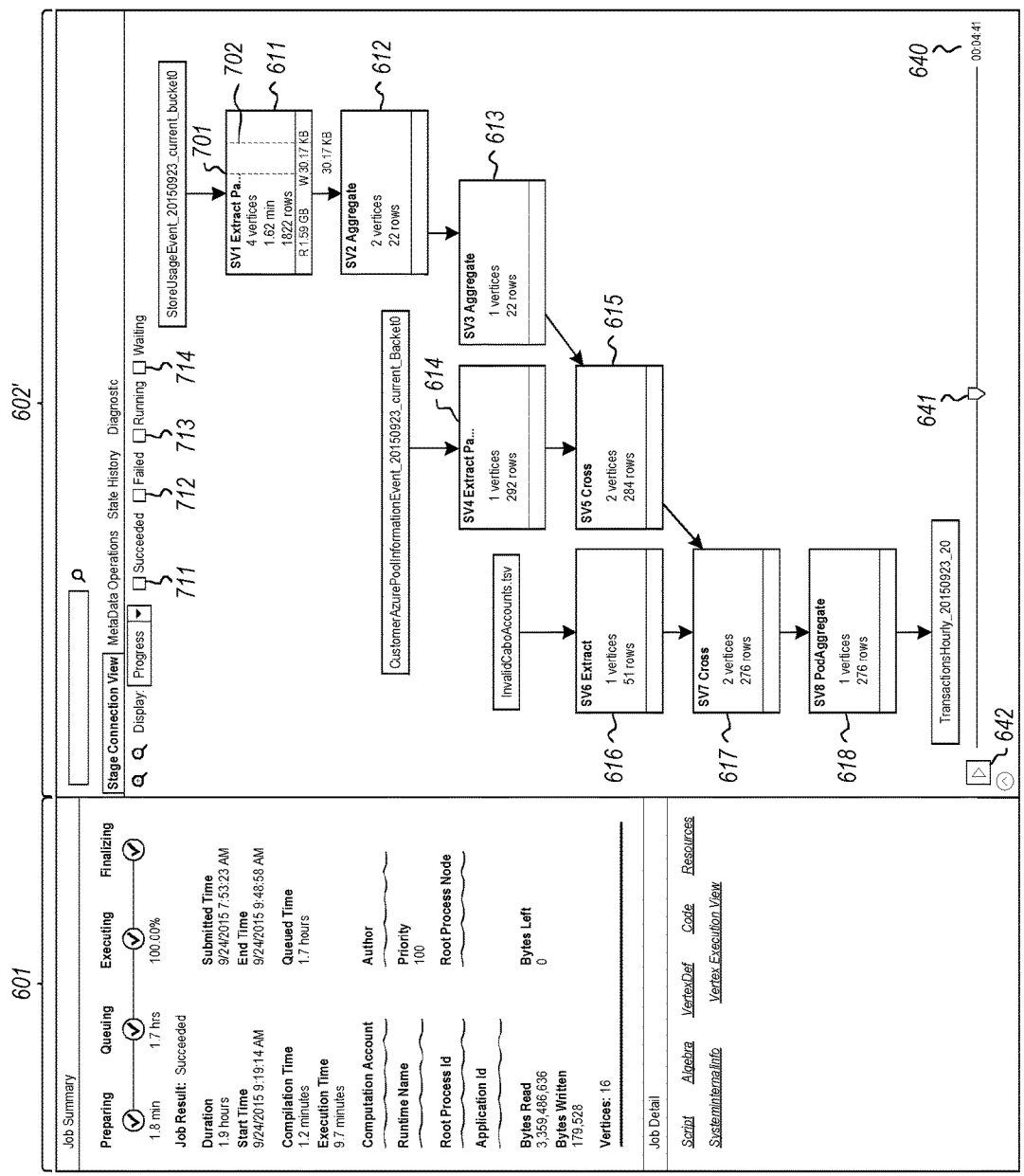
FIG. 7 illustrates a user interface similar to that of FIG. 6, except with playback being initiated.

FIG. 7 illustrates a user interface 700 similar to that of FIG. 6, except with playback being initiated. The left pane 601 is shown unchanged. However, in FIG. 7, the right pane shows playback at time 4:41, according to the tracker 642 within the playback control 640. Data within each node reflects the performance data to that point in the playback. For instance, nodes 612 through 618 have not even started yet at time 4:41, but data within node 611 shows that 1.59 MB have been read and 30.17 KB have been thus far written. This might perhaps suggest to the user that the node 611 is taking a lot of time to execute because of so much data being read.

The node 611 shows via progress bars 701 and 702 that the first set of vertices (corresponding to node 611) is still executing this time. The progress bar 701 (or the portion of the node 601 to the left of the progress bar 701) might likewise show appropriate coloring for the color shown in the box 711 to the left of "Succeeded" label to symbolize the proportion of tasks in the node that have succeeded at this point in time (at time marker 4:41). The progress bar 702 (or the portion of the node 601 between the progress bars 701 and 702) might likewise show an appropriate different coloring for the coloring shown in the box 713 to left of the "Running" label to symbolize the proportion of tasks in the node that are running at this point in time (at time marker 4:41). Similar colored progress bars might be shown within coloring corresponding to box 712 if there are failed tasks within the node at this particular point in time, or shown within coloring corresponding to box 714 if there are tasks waiting at this particular point in time.

Figure 8:
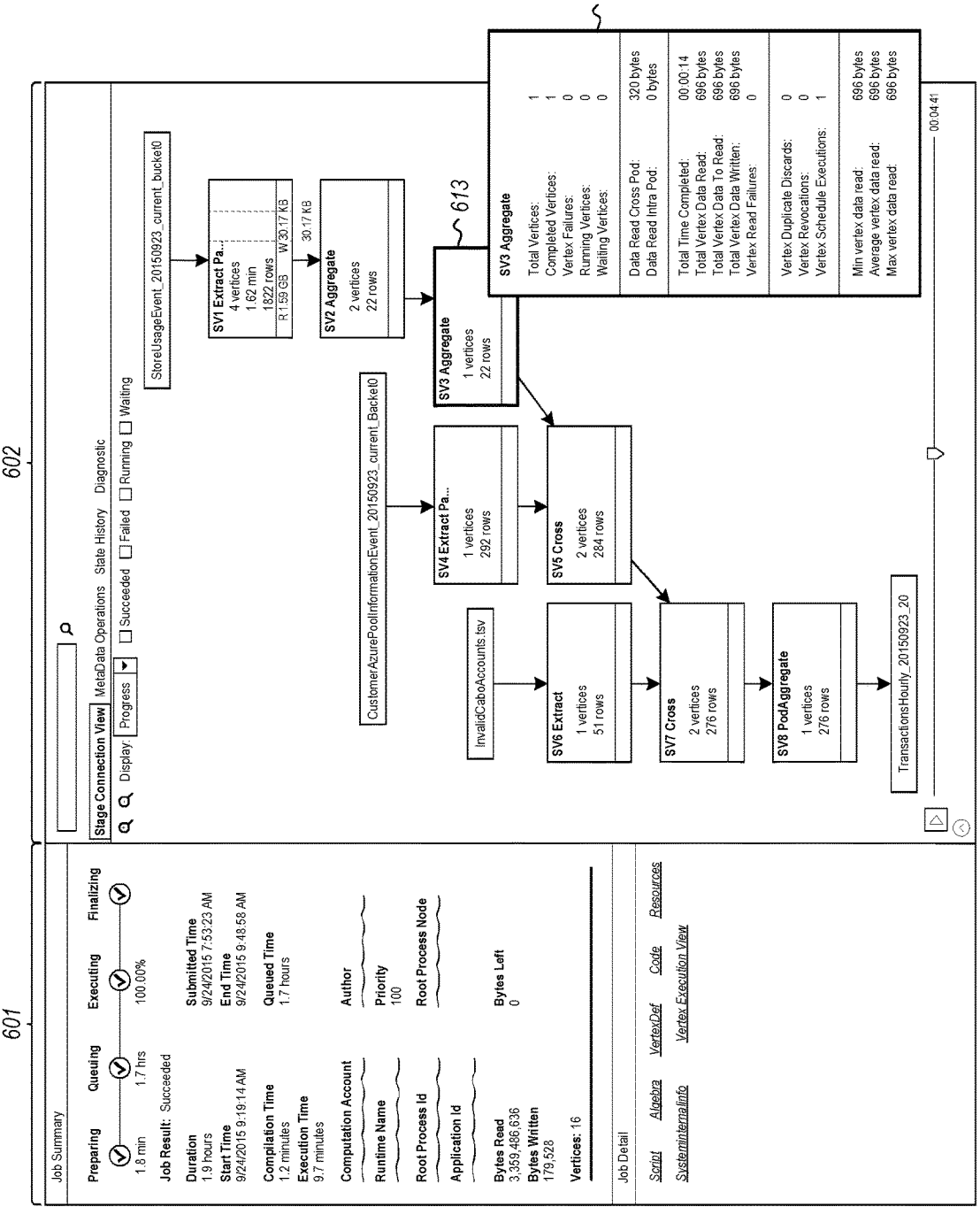
FIG. 8 illustrates a further user interface, which is similar to that of FIG. 7, except with one of the vertex sets being selected, and with data regarding those vertices being illustrated via a popup.

FIG. 8 illustrates a further user interface 800, which is similar to the user interface 700 of FIG. 7, except with one of the vertex sets SV3 (node 613) being selected, and with data regarding those vertices being illustrated via a popup details user interface 801. The details user interface 801 shows a variety of data regarding the node 613 as that data existed at the particular time (or 4:41) including total vertices (in this case—just 1 vertex), the number of completed vertices (zero in this case as at time 4:41, the node 613 has not substantially started, the number of vertex failures (again zero), the number of running vertices (again zero), and the number of waiting vertices (again zero).

The details user interface 801 also shows data read cross pod, the data read intra pod, the total time completed, the total vertex data read, total vertex data to read (the same as total vertex data read since at this point 4:41 in time, no vertex data has been read yet), the total vertex data written, the vertex read failures, the vertex duplicate discards, the vertex revocations, and the vertex schedule executions. The details user interface 801 also shows the minimum vertex data read, the average vertex data read, and the maximum vertex data read. These latter three parameters are all the same since there is but one vertex that is part of the node 613.

Figure 9:
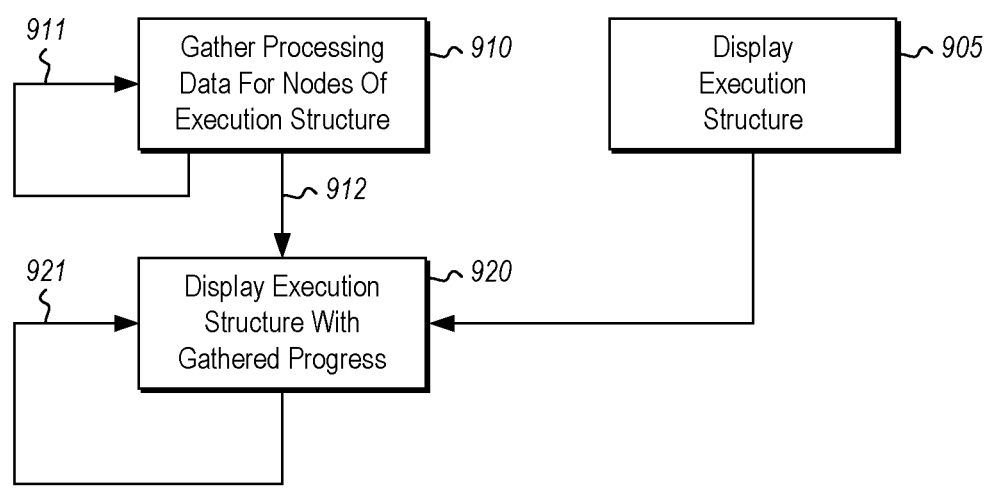
FIG. 9 illustrates a flowchart of a method for visualizing progress of a distributed computational job at multiple points of execution in accordance with the principles described herein.

FIG. 9 illustrates a flowchart of a method 900 for visualizing progress of a distributed computational job at multiple points of execution in accordance with the principles described herein. The method 900 includes gathering processing information regarding processing of multiple vertices of a computational job at an instant in time (act 910). Note that arrow 911 represents that this act of gathering may be repeated for multiple instances in time. As an example, the act 910 may be performed by the processing gathering module 501 of FIG. 5.

The method 900 also includes graphically presenting a representation of an execution structure representing multiple nodes of the computational job, and dependencies between the multiple nodes (act 905). Note that act 905 is shown in parallel with act 910 to represent that the execution structure may be displayed (act 905) before, during and/or after the processing information is gathered (905). The act 905 may be performed by, for instance, the user interface module 502 of FIG. 2.

The method 900 also includes visualizing the gathered processing information (act 920). The arrow 912 represents that the gathered processing information may be represented incrementally at each point in time at which processing information is gathered (i.e., each time act 910 is performed). Alternatively, several points in time of processing information may be gathered prior to the gathered processing information being presented in act 920. At one extreme, for instance, perhaps many of points of time of processing information are gathered, but only the result is shown, or perhaps some points in time are displayed only upon playback. At the other extreme, perhaps the user interface is updated at each instance in time. Accordingly, arrow 921 represents a potential refresh in the screen (either while execution is happening live, or while playback is occurring).

In summary, the principles described herein feature creation of an execution model of distributed jobs (such as queries) together with a data model for capturing execution progress. These models are used to collect telemetry in a way that allows graphical tools to visualize the query in a graphical tree structure, re-play the execution in shorter time, and color or otherwise visually emphasize the job tree according to statistical evaluation of job progress. The developer can pause the replay or jump to specific places in the timeline of the job in order to understand query execution problems that cannot otherwise be easily identified. Thus, a valuable tool for improving the development and performance of distributed computational jobs has been provided.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that determines and graphically displays progress of a distributed computational job at multiple points during execution of the distributed computational job, the system comprising a display device and one or more computer processors upon which computer-executable instructions are executed, the system configured to perform:

gathering processing information for each of a plurality of vertices of a computational job being processed in a distributed system, each vertex being one of a plurality of smaller logical tasks that the computational job has been divided into, the processing information for each of the plurality of vertices being gathered at each of a plurality of times during execution of the computational job;

for each vertex, storing the processing information in an associated vertex data structure, each vertex data structure comprising and storing values for a plurality of data fields including a vertex identifier, and operational data including a processing node identifier, a job result indication, a time; and a duration; and generating a user interface that graphically displays a representation of an execution structure of the computational job, the execution structure comprising a plurality of collections, each collection comprising one or more of the vertices, the representation of the execution structure also indicating dependencies between the collections of vertices during execution of the computational job, the representation including the stored processing information as it existed at each of the plurality of times during execution of the computational job, and the user interface including a playback control that, upon receiving associated user input, causes the user interface to display a state of the execution of the computational job at a particular time during the execution of the computational job.

2. The computing system in accordance with claim 1, further configured to:
schedule the plurality of vertices of the computation job on a plurality of processing nodes in the distributed system.

3. The computing system in accordance with claim 2, further configured to:
compile a job description into the plurality of vertices, and provides the multiple vertices to the scheduler module.

4. The computing system in accordance with claim 1, further configured to:
graphically represent the execution structure by providing a visualization for a vertex, and representing performance of that vertex with respect to a norm.

5. The computing system in accordance with claim 4, configured to:
present a control that allows a performance parameter for comparison to the norm to be changed.

6. The computing system in accordance with claim 1, configured to:
graphically represent the execution structure by providing a visualization for a vertex set.

7. The computing system in accordance with claim 6, the visualization of the vertex set being with respect to a norm.

8. The computing system in accordance with claim 6, configured to:
present a control that allows a performance parameter for comparison to the norm to be changed.

9. The computing system in accordance with claim 6, the vertex set comprising a set of vertices within a stage of the computational job.

10. The computing system in accordance with claim 1, the displayed representation including data throughput.

11. The computing system in accordance with claim 1, the displayed representation including a read rate.

12. The computing system in accordance with claim 1, the displayed representation including a write rate.

13. The computing system in accordance with claim 1, the displayed representation including a processing rate.

14. The computing system in accordance with claim 1, the displayed representation including a completion status.

15. The computing system in accordance with claim 1, further configured to:
enable playback of the execution of the computational job.

16. The computing system in accordance with claim 15, the playback being enabled via one or more controls that are presented with the representation of the execution structure, the one or more controls further allowing for navigation to a particular point in time of the execution of the computational job.

17. The computing system in accordance with claim 1, further configured to:
provide one or more controls to allow a node of the execution structure to be selected to thereby present a more detailed view of performance for the select node.

18. A method for determining and graphically displaying progress of a distributed computational job at multiple times during execution of the distributed computational job, the method performed by executing instructions on one or more computer processors, the method comprising:
gathering processing information for each of a plurality of vertices of a computational job being processed in a distributed system, each vertex being one of a plurality of smaller logical tasks that the computational job has been divided into, the processing information for each of the plurality of vertices being gathered at each of a plurality of times during execution of the computational job;

for each vertex, storing the processing information in an associated vertex data structure, each vertex data structure comprising and storing values for a plurality of data fields including a vertex identifier, and operational data including a processing node identifier, a job result indication, a time; and a duration; and generating a user interface that graphically displays a representation of an execution structure of the computational job, the execution structure comprising a plurality of collections, each collection comprising one or more of the vertices, the representation of the execution structure also indicating dependencies between the collections of vertices during execution of the computational job, the representation including the stored processing information as it existed at each of the plurality of times of execution during the computational job, and the user interface including a playback control that, upon receiving associated user input, causes the user interface to display a state of the execution of the computational job at a particular time during the execution of the computational job.

19. A method for determining and graphically displaying progress of a distributed computational job at multiple times during execution of the distributed computational job, the method performed by executing instructions on one or more computer processors, the method comprising:
gathering processing information for each of a plurality of vertices of a computational job at a first point in time, each of the multiple vertices being processed by a different processing node of multiple nodes in a distributed system;

for each vertex, storing the processing information gathered at the first point in time in an associated vertex data structure, each vertex data structure comprising and storing values for a plurality of data fields including a vertex identifier, and operational data including a processing node identifier, a job result indication, a time, and a duration;

gathering processing information regarding processing of the plurality of vertices of the computational job at a second point in time that is after the first point in time;

for each vertex, storing the processing information gathered at the second point in time in an associated vertex data structure, each associated vertex data structure comprising and storing values for a plurality of data fields including a vertex identifier, and operational data including a processing node identifier, a job result indication, a time, and a duration;

graphically presenting a representation of an execution structure representing the multiple nodes during the processing of the multiple vertices of the computational job and displaying dependencies between the multiple nodes during execution of the computational job; and graphically displaying the gathered processing information as it existed at the first point in time, and at the second point in time.

* * * * *